US011301191B2

(12) United States Patent
Nakamura et al.

(10) Patent No.: US 11,301,191 B2
(45) Date of Patent: Apr. 12, 2022

(54) PRINTING APPARATUS, CONTROLLING METHOD THEREFOR, AND STORAGE MEDIUM

(71) Applicant: CANON KABUSHIKI KAISHA, Tokyo (JP)

(72) Inventors: Hironori Nakamura, Kanagawa (JP); Tatsunori Sasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 25 days.

(21) Appl. No.: 17/032,821

(22) Filed: Sep. 25, 2020

(65) Prior Publication Data

US 2021/0096797 A1    Apr. 1, 2021

(30) Foreign Application Priority Data

Sep. 30, 2019    (JP) .............................. JP2019-179210

(51) Int. Cl.
| G06F 3/12 | (2006.01) |
| H04N 1/00 | (2006.01) |
| H04N 1/21 | (2006.01) |
| G06F 3/06 | (2006.01) |

(52) U.S. Cl.
CPC ............ *G06F 3/1261* (2013.01); *G06F 3/064* (2013.01); *G06F 3/0616* (2013.01); *G06F 3/0656* (2013.01); *G06F 3/0679* (2013.01); *G06F 3/1246* (2013.01); *H04N 1/00344* (2013.01); *H04N 1/2129* (2013.01)

(58) Field of Classification Search
None
See application file for complete search history.

(56) References Cited

U.S. PATENT DOCUMENTS

| 8,718,495 B2 * | 5/2014 | Chihara ............. G03G 21/1882 |
| | | 399/24 |
| 10,705,773 B2 | 7/2020 | Sasaki et al. ....... G06F 12/0246 |
| 2020/0241808 A1 * | 7/2020 | Ogasawara ........... G06F 3/1238 |

FOREIGN PATENT DOCUMENTS

JP    2009-55457    3/2009

* cited by examiner

*Primary Examiner* — Kevin Verbrugge
(74) *Attorney, Agent, or Firm* — Venable LLP

(57) ABSTRACT

A printing apparatus includes a non-volatile memory and a management unit that performs management in a case of using the non-volatile memory as a spool buffer for print data. The management unit includes a first derivation unit that derives a first life time consumption rate of the non-volatile memory based on the cumulative number of printed sheets of print media printed with a printing unit, and a second derivation unit that derives a second life time consumption rate of the non-volatile memory based on the number of times of rewriting operations of the non-volatile memory. The management unit controls a capacity allocated to a spool buffer to be defined in the non-volatile memory based on a result of comparison between the second life time consumption rate and the first life time consumption rate.

20 Claims, 10 Drawing Sheets

Pre_EOL_Information

| VALUE | MEANING | CONTENT |
|---|---|---|
| 0x00 | UNDEFINED | — |
| 0x01 | NORMAL | LESS THAN 80% OF SUBSTITUTE BLOCKS CONSUMED |
| 0x02 | WARNING | 80% OF SUBSTITUTE BLOCKS CONSUMED |
| 0x03 | EMERGENCY | SUBSTITUTE BLOCKS DEPLETED |
| 0x04~0xFF | BACKUP | — |

FIG.6

DEVICE LIFE TIME ESTIMATION

| VALUE | CONTENT |
|---|---|
| 0x00 | — |
| 0x01 | 0% TO 10% OF DEVICE LIFE TIME CONSUMED |
| 0x02 | 10% TO 20% OF DEVICE LIFE TIME CONSUMED |
| 0x03 | 20% TO 30% OF DEVICE LIFE TIME CONSUMED |
| 0x04 | 30% TO 40% OF DEVICE LIFE TIME CONSUMED |
| 0x05 | 40% TO 50% OF DEVICE LIFE TIME CONSUMED |
| 0x06 | 50% TO 60% OF DEVICE LIFE TIME CONSUMED |
| 0x07 | 70% TO 80% OF DEVICE LIFE TIME CONSUMED |
| 0x08 | 80% TO 90% OF DEVICE LIFE TIME CONSUMED |
| 0x09 | 90% TO 100% OF DEVICE LIFE TIME CONSUMED |
| 0x0A | ABOVE MAXIMUM VALUE OF ESTIMATED DEVICE LIFE TIME |
| Others | — |

FIG.7

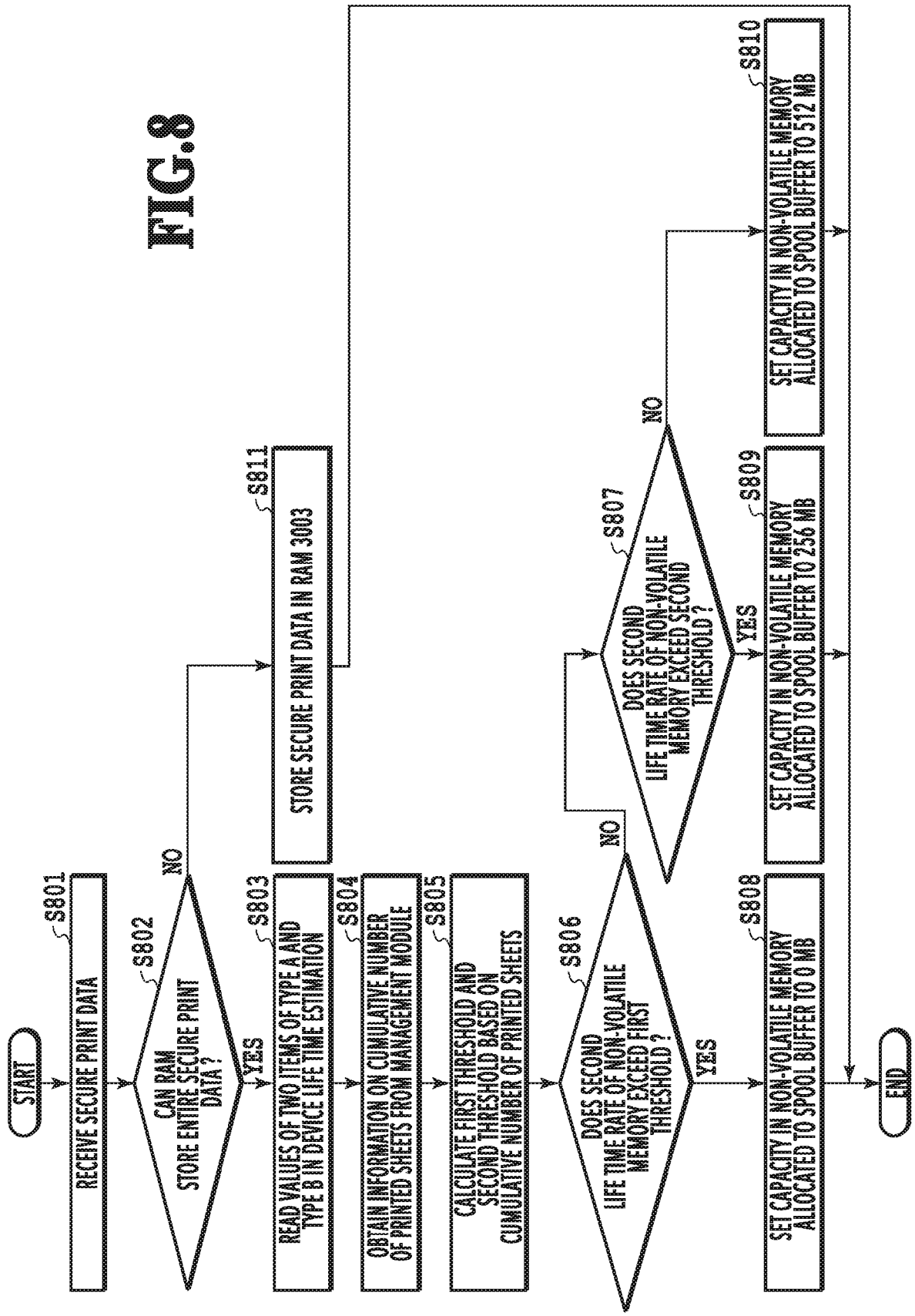

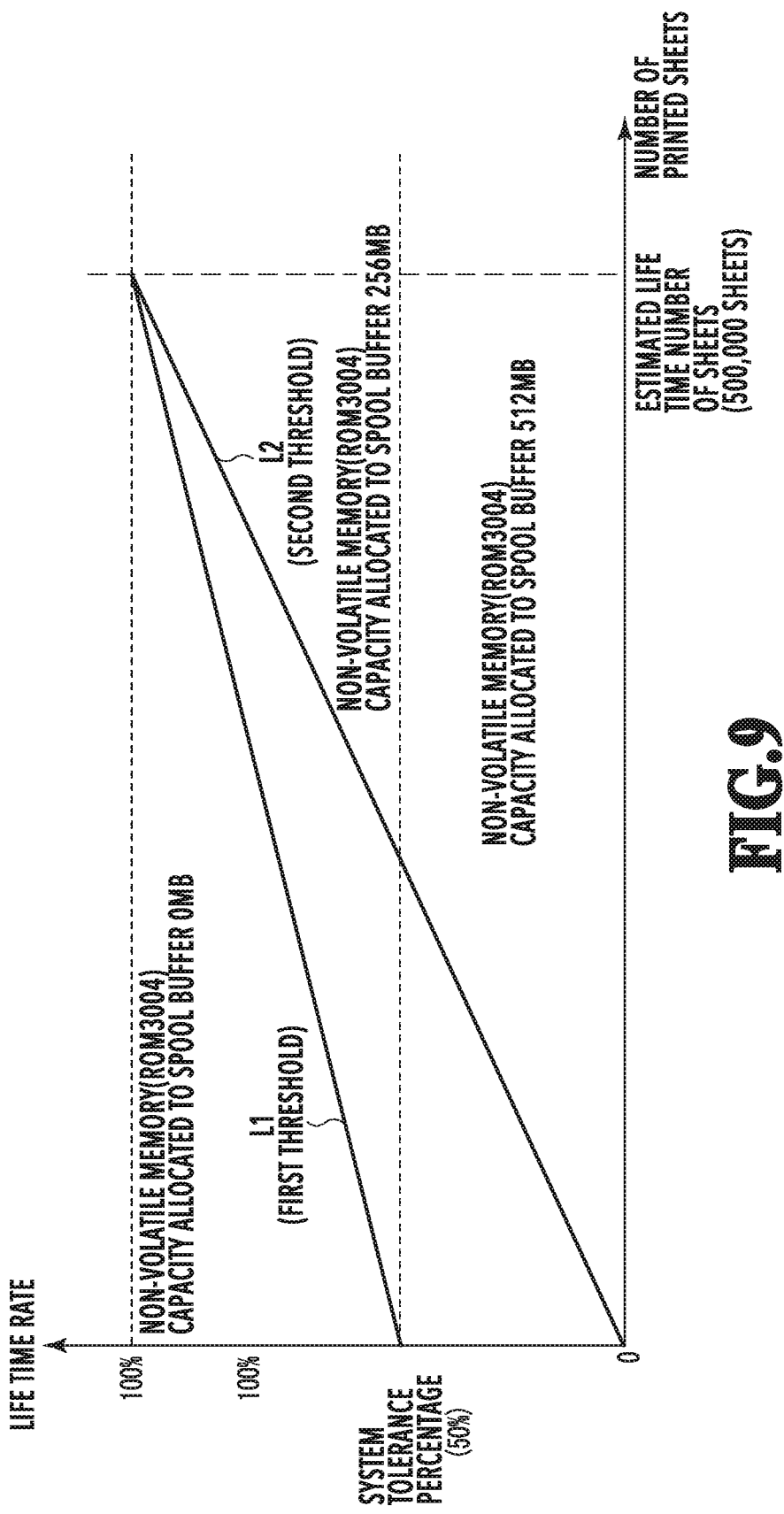

PRINTING APPARATUS, CONTROLLING METHOD THEREFOR, AND STORAGE MEDIUM

BACKGROUND OF THE INVENTION

Field of the Invention

This disclosure relates to a printing apparatus, a controlling method therefor, and a storage medium. More specifically, this disclosure relates to a technique for spooling print data in a printing apparatus.

Description of the Related Art

There is a printer to be shared in an office which allows selection of a mode to withhold immediate print output of print data sent by a user from a printer and to carry out the print output for the first time on the condition that the user performs a predetermined input operation in front of the printer. This print output mode is called secure printing in light of information security.

In order to execute the secure printing, it is necessary to temporarily store the print data transmitted to the printer. In addition to a volatile memory, a non-volatile memory is used as a device for temporarily storing the print data. A NAND flash memory can write data at high speed and can be configured at a low cost, but has a limitation in the number of times of rewriting operations.

Japanese Patent Laid-Open No. 2009-55457 discloses a method of controlling a non-volatile memory such as a NAND flash memory, which has a limitation in the number of times of rewriting operations. Japanese Patent Laid-Open No. 2009-55457 proposes a method of detecting defective blocks out of blocks in the non-volatile memory having the limited number of times of rewriting operations, and restricting the writing into the non-volatile memory in a case where the number of detected defective blocks reaches a predetermined number.

SUMMARY OF THE INVENTION

The technique disclosed in Japanese Patent Laid-Open No. 2009-55457 is designed on the assumption that the number of defective blocks in the non-volatile memory can be counted accurately. However, NAND application products diffused nowadays include some products which cannot count the number of defective blocks therein. For example, such NAND application products include a product called an embedded multimedia card (hereinafter abbreviated as eMMC). The eMMC includes a NAND flash memory and a NAND flash memory controller formed in one chip, and makes it possible to independently conduct management and control of a memory unit inside. The use of the eMMC enables a printer control unit to write, to read, and to delete data easily by issuing corresponding commends without being bothered by cumbersome processing such as wear leveling. Nonetheless, such a NAND application product may lack a measure to count an accurate number of defective blocks therein.

Processing to replace defective blocks generated inside with substitute blocks is carried out in the case of using the eMMC. Then, the printer control unit is enabled for the first time to detect information on the aforementioned defective blocks at a time point that requires an emergency treatment in a state where 80% of the substitute blocks are used or in a state where the substitute blocks are almost depleted. However, numerous defective blocks have already been generated at this point. Moreover, since the NAND flash memory controller has been using the respective blocks evenly as a result of conducting the wear leveling, it is highly likely that the rest of the blocks will also turn into defective blocks soon. Accordingly, even if the writing into the non-volatile memory is restricted at the point of detection of the information on the defective blocks, the printer itself is at risk of lapsing into an inoperable state soon.

An object of this disclosure is to provide a technique for keeping a printing apparatus from lapsing into an inoperable state due to a non-volatile memory coming to the end of its life time before the number of sheets printed with the printing apparatus reaches the number of sheets estimated to be printable with the printing apparatus during its life time.

An aspect of this disclosure provides a printing apparatus including a non-volatile memory having an upper limit in the number of times of data rewriting operations, and a management unit configured to manage use of the non-volatile memory as a spool buffer for print data. Here, the management unit includes a first derivation unit configured to derive a first life time consumption rate based on a cumulative number of printed sheets of print media printed with a printing unit, the first life time consumption rate indicating a state of consumption of a life time of the non-volatile memory, and a second derivation unit configured to derive a second life time consumption rate based on the number of times of rewriting operations of the non-volatile memory, the second life time consumption rate indicating the state of consumption of the life time of the non-volatile memory. The management unit controls a capacity allocated to a spool buffer being defined in the non-volatile memory based on a result of comparison between the second life time consumption rate and the first life time consumption rate.

Further features of the present invention will become apparent from the following description of exemplary embodiments with reference to the attached drawings.

BRIEF DESCRIPTION OF THE DRAWINGS

FIG. 6 is a diagram showing contents of a "pre_EOL_information" item;

FIG. 7 is a diagram showing contents of a "device life time estimation" item;

FIG. 8 is a flowchart showing spool data write processing used in secure printing;

FIG. 9 is a graph showing a first life time rate calculated based on the number of printed sheets.

DESCRIPTION OF THE EMBODIMENTS

Embodiments of this disclosure will be described below in detail with reference to the drawings.

First Embodiment

<Printer Configuration>

Figure 1:
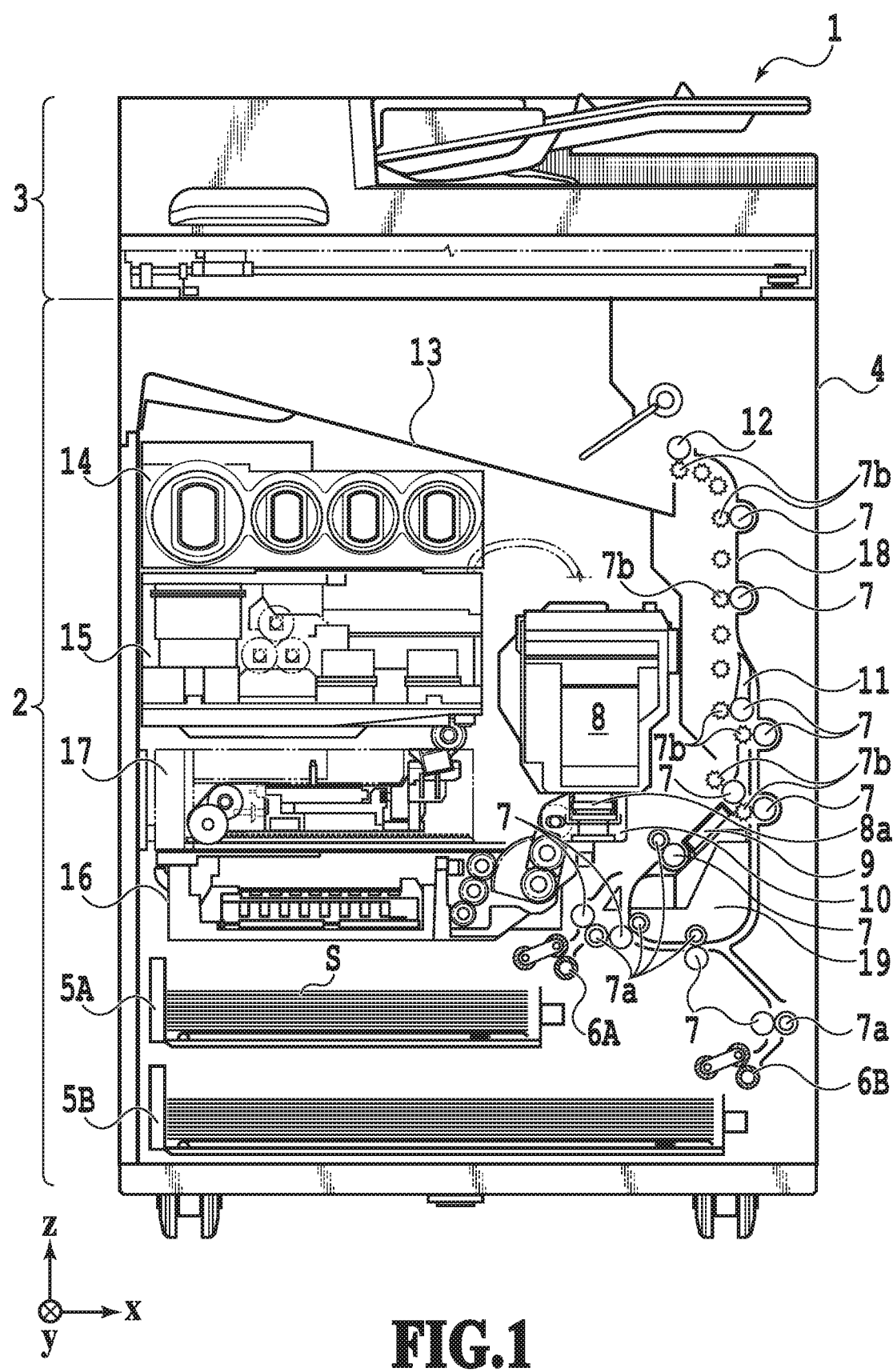
FIG. 1 is a diagram showing a printer in a standby state.

FIG. 1 is an internal configuration diagram of an inkjet printing apparatus 1 (hereinafter "printing apparatus 1") used in the present embodiment. In the drawings, an x-direction is a horizontal direction, a y-direction (a direction perpendicular to paper) is a direction in which ejection openings are arrayed in a print head 8 described later, and a z-direction is a vertical direction.

The printing apparatus 1 is a multifunction printer comprising a print unit 2 and a scanner unit 3. The printing apparatus 1 can use the print unit 2 and the scanner unit 3 separately or in synchronization to perform various processes related to print operation and scan operation. The scanner unit 3 comprises an automatic document feeder (ADF) and a flatbed scanner (FBS) and is capable of scanning a document automatically fed by the ADF as well as scanning a document placed by a user on a document plate of the FBS. The present embodiment is directed to the multifunction printer comprising both the print unit 2 and the scanner unit 3, but the scanner unit 3 may be omitted. FIG. 1 shows the printing apparatus 1 in a standby state in which neither print operation nor scan operation is performed.

In the print unit 2, a first cassette 5A and a second cassette 5B for housing print medium (cut sheets) S are detachably provided at the bottom of a casing 4 in the vertical direction. Relatively small print medium of up to A4 size are stacked and housed in the first cassette 5A and relatively large print medium of up to A3 size are stacked and hosed in the second cassette 5B. A first feeding unit 6A for feeding housed print medium one by one is provided near the first cassette 5A. Similarly, a second feeding unit 6B is provided near the second cassette 5B. In print operation, a print medium S is selectively fed from either one of the cassettes.

Conveying rollers 7, a discharging roller 12, pinch rollers 7a, spurs 7b, a guide 18, an inner guide 19, and a flapper 11 are conveying mechanisms for guiding a print medium S in a predetermined direction. The conveying rollers 7 are drive rollers located upstream and downstream of the print head 8 and driven by a conveying motor (not shown). The pinch rollers 7a are follower rollers that are turned while nipping a print medium S together with the conveying rollers 7. The discharging roller 12 is a drive roller located downstream of the conveying rollers 7 and driven by the conveying motor (not shown). The spurs 7b nip and convey a print medium S together with the conveying rollers 7 and discharging roller 12 located downstream of the print head 8.

The guide 18 is provided in a conveying path of a print medium S to guide the print medium S in a predetermined direction. The inner guide 19 is a member extending in the y-direction. The inner guide 19 has a curved side surface and guides a print medium S along the side surface. The flapper 11 is a member for changing a direction in which a print medium S is conveyed in duplex print operation. A discharging tray 13 is a tray for stacking and housing print medium S that were subjected to print operation and discharged by the discharging roller 12.

The print head 8 of the present embodiment is a full line type color inkjet print head. In the print head 8, a plurality of ejection openings configured to eject ink based on print data are arrayed in the y-direction in FIG. 1 so as to correspond to the width of a print medium S. That is, the print head is configured to eject inks of a plurality of colors. When the print head 8 is in a standby position, an ejection opening surface 8a of the print head 8 is oriented vertically downward and capped with a cap unit 10 as shown in FIG. 1. In print operation, the orientation of the print head 8 is changed by a print controller 202 described later such that the ejection opening surface 8a faces a platen 9. The platen 9 includes a flat plate extending in the y-direction and supports a print medium S being subjected to print operation by the print head 8 from the back side.

An ink tank unit 14 separately stores ink of four colors to be supplied to the print head 8. An ink supply unit 15 is provided in the midstream of a flow path connecting the ink tank unit 14 to the print head 8 to adjust the pressure and flow rate of ink in the print head 8 within a suitable range. The present embodiment adopts a circulation type ink supply system, where the ink supply unit 15 adjusts the pressure of ink supplied to the print head 8 and the flow rate of ink collected from the print head 8 within a suitable range.

A maintenance unit 16 comprises the cap unit 10 and a wiping unit 17 and activates them at predetermined timings to perform maintenance operation for the print head 8.

Figure 2:
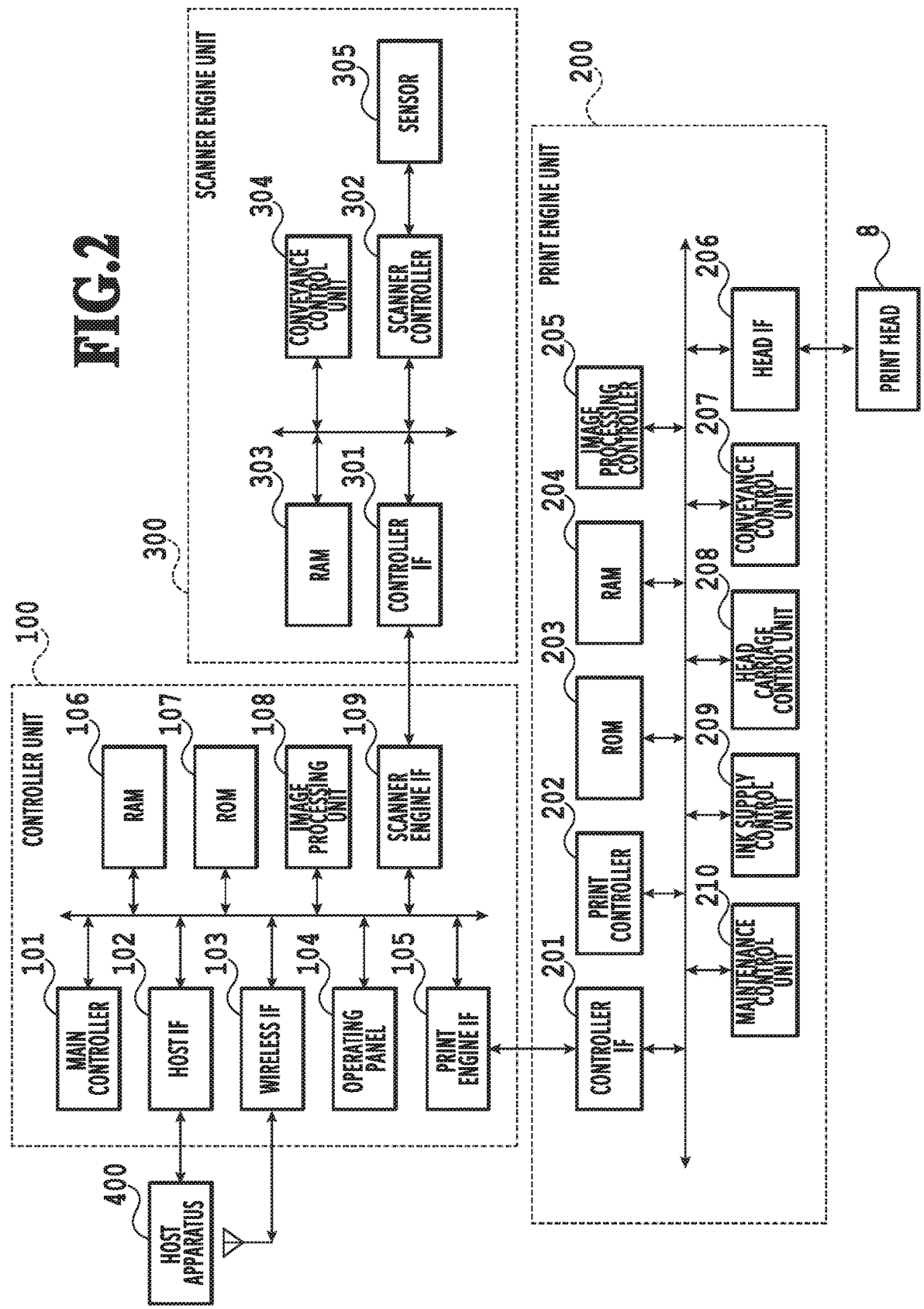
FIG. 2 is a block diagram showing a control configuration of the printer.

FIG. 2 is a block diagram showing a control configuration in the printing apparatus 1. The control configuration mainly includes a print engine unit 200 that exercises control over the print unit 2, a scanner engine unit 300 that exercises control over the scanner unit 3, and a controller unit 100 that exercises control over the entire printing apparatus 1. A print controller 202 controls various mechanisms of the print engine unit 200 under instructions from a main controller 101 of the controller unit 100. Various mechanisms of the scanner engine unit 300 are controlled by the main controller 101 of the controller unit 100. The control configuration will be described below in detail.

In the controller unit 100, the main controller 101 including a CPU controls the entire printing apparatus 1 using a RAM 106 as a work area in accordance with various parameters and programs stored in a ROM 107. For example, when a print job is input from a host apparatus 400 via a host I/F 102 or a wireless I/F 103, an image processing unit 108 executes predetermined image processing for received image data under instructions from the main controller 101. The main controller 101 transmits the image data subjected to the image processing to the print engine unit 200 via a print engine I/F 105.

In the controller unit 100, the main controller 101 including a CPU controls the entire printing apparatus 1 using a RAM 106 as a work area in accordance with various parameters and programs stored in a ROM 107. For example, when a print job is input from a host apparatus 400 via a host I/F 102 or a wireless I/F 103, an image processing unit 108 executes predetermined image processing for received image data under instructions from the main controller 101. The main controller 101 transmits the image data subjected to the image processing to the print engine unit 200 via a print engine I/F 105.

An operating panel 104 is a mechanism to allow a user to do input and output for the printing apparatus 1. A user can give an instruction to perform operation such as copying and scanning, set a print mode, and recognize information about the printing apparatus 1 via the operating panel 104.

In the print engine unit 200, the print controller 202 including a CPU controls various mechanisms of the print unit 2 using a RAM 204 as a work area in accordance with various parameters and programs stored in a ROM 203. When various commands and image data are received via a controller I/F 201, the print controller 202 temporarily stores them in the RAM 204. The print controller 202 allows an image processing controller 205 to convert the stored image data into print data such that the print head 8 can use it for print operation. After the generation of the print data, the print controller 202 allows the print head 8 to perform print operation based on the print data via a head I/F 206. At this time, the print controller 202 conveys a print medium S by driving the feeding units 6A and 6B, conveying rollers 7, discharging roller 12, and flapper 11 shown in FIG. 1 via a conveyance control unit 207. The print head 8 performs print operation in synchronization with the conveyance operation of the print medium S under instructions from the print controller 202, thereby performing printing.

A head carriage control unit 208 changes the orientation and position of the print head 8 in accordance with an operating state of the printing apparatus 1 such as a maintenance state or a printing state. An ink supply control unit 209 controls the ink supply unit 15 such that the pressure of ink supplied to the print head 8 is within a suitable range. A maintenance control unit 210 controls the operation of the cap unit 10 and wiping unit 17 in the maintenance unit 16 when performing maintenance operation for the print head 8.

In the scanner engine unit 300, the main controller 101 controls hardware resources of the scanner controller 302 using the RAM 106 as a work area in accordance with various parameters and programs stored in the ROM 107, thereby controlling various mechanisms of the scanner unit 3. For example, the main controller 101 controls hardware resources in the scanner controller 302 via a controller I/F 301 to cause a conveyance control unit 304 to convey a document placed by a user on the ADF and cause a sensor 305 to scan the document. The scanner controller 302 stores scanned image data in a RAM 303. The print controller 202 can convert the image data acquired as described above into print data to enable the print head 8 to perform print operation based on the image data scanned by the scanner controller 302.

Meanwhile, the printer configured as described above may occasionally be used as a printer shared by multiple users in an office or the like. Such a shared printer may adopt a mode to withhold start of outputting a printed material unless a user actually goes to the front of the printer and instructs print output after transmitting print data to the printer. This printing mode is called "secure printing" in light of information security. On the other hand, there is also a mode to start outputting a printed material at the point of transmission of the print data. This mode is called "non-secure printing".

In order to provide an environment that enables the secure printing, the printer needs to be equipped with a data storage system that temporarily stores the print data without immediately conducting print output. Here, an act of temporarily storing print data is generally called spool and a memory area for storing spool data is called a spool buffer. Now, a description will be given of a data storage system provided in this embodiment.

<Data Storage System of Controller Unit>

Figure 3:
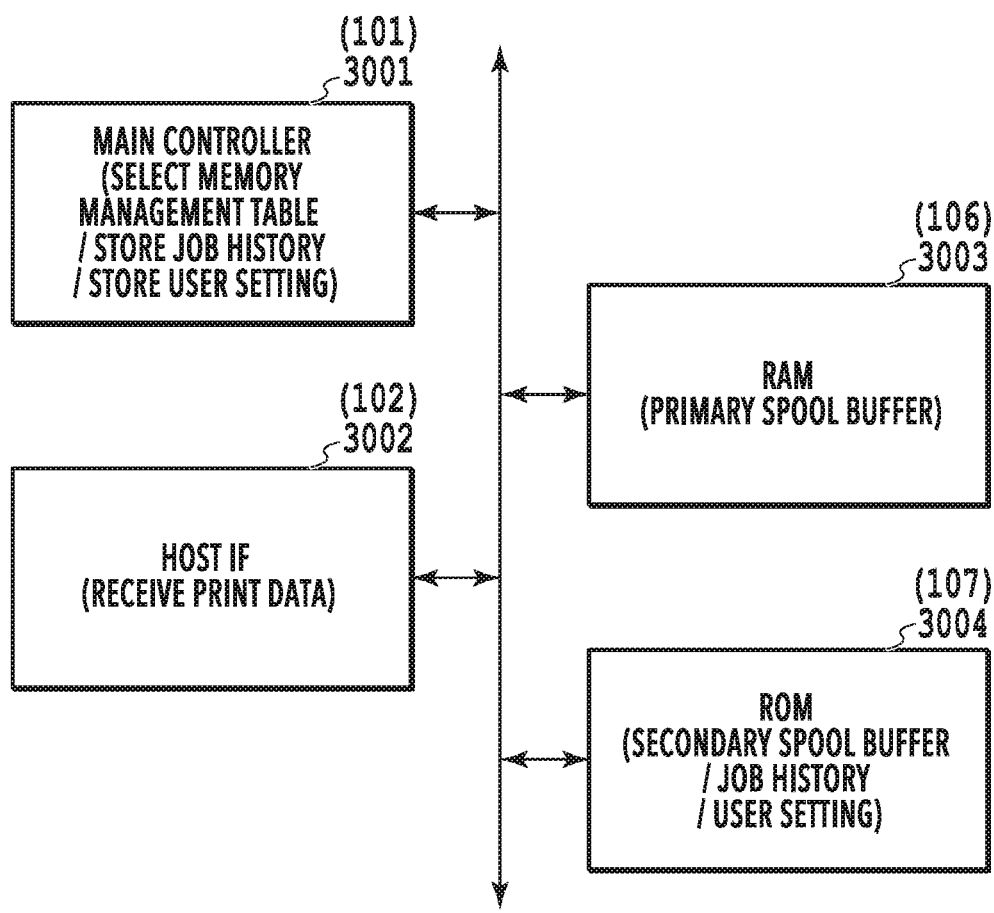
FIG. 3 is a block diagram showing a detailed configuration of a controller unit.

FIG. 3 is a block diagram showing constituents of principal part of this embodiment extracted from the constituents shown in FIG. 2. Note that the main controller 101, the host IF 102, the RAM 106, and the ROM 107 shown in FIG. 2 are described as a main controller 3001, a host IF 3002, a RAM 3003, and a ROM 3004 in FIG. 3, respectively.

The print data received through the host IF 3002 is stored once in a spool buffer of the printer 1. As discussed earlier, the printing modes include the secure printing and the non-secure printing. In this embodiment, two types of spool buffers, namely, a secure printing spool buffer and a non-secure printing spool buffer are provided on the assumption that secure printing operations and non-secure printing operations are carried out.

In the non-secure printing, the printing is started as soon as the print engine unit 200 is available. Accordingly, the print data for the non-secure printing is held in the printer 1 for a short time. Even if multiple users transmit the print data, a spool buffer with a small capacity can process these data. As a consequence, the non-secure printing spool buffer can be realized only by using an area in the RAM 3003. On the other hand, in the case of the secure printing, the printer 1 needs to hold a large amount of print data in a case where multiple users transmit the print data but those users do not instruct print output in front of the printer, for instance. In this case, a large-capacity spool buffer is required. Accordingly, the secure printing spool buffers are secured both in the RAM 3003 and in the ROM 3004.

An SRAM inside an IC that controls the printer 1 or a DRAM outside the IC may be used as the RAM 3003. This embodiment assumes to use a DRAM because the spool buffer needs a relatively large-capacity memory area. In the meantime, a NOR flash memory or a NAND flash memory may be used as the ROM 3004. Nonetheless, the NAND flash memory is preferable in light of a necessity of a large-capacity memory area. In particular, this embodiment assumes use of an eMMC, which embeds a controller to perform control such as wear leveling and a NAND flash memory in one chip. A spool area on the eMMC may be a non-file system area that the CPU can directly view on a memory map, or a file system area by the intermediary of a file system. Note that this embodiment uses the non-file system area as the spool area on the eMMC.

As discussed earlier, the ROM 3004 has a limitation in the number of times of rewriting operations. Accordingly, the spool data is usually stored in the RAM 3003 that does not have a limitation in the number of times of rewriting operations, and is stored in the ROM 3004 only in a case where an amount of the spool data exceeds a capacity of the spool buffer secured in the RAM 3003. In other words, it is preferable to use the ROM 3004 supplementarily. Meanwhile, since the print data may contain confidential information, the print data after having been printed out is preferably deleted from the printer 1 unless the circumstances are exceptional. Accordingly, it is convenient to store the spool data in the RAM 3003 because the print data in the RAM 3003 will be automatically deleted by turning the printer 1 off even in case of a failure to delete the print data. On the other hand, in the case of storing the spool data in the ROM 3004, the print data in the ROM will not be deleted automatically in the case where the printer 1 is turned off. In this regard, the ROM 3004 is less advantageous than the RAM 3003 in light of security. In addition, since write operations occur twice for recording the print data and deleting the print data, the ROM 3004 is less advantageous than the RAM 3003 in light of the limitation in the number of times of rewriting operations.

Due to the above-mentioned reasons, FIG. 3 describes the spool buffer in the RAM 3003 as a primary spool buffer that has a high priority for use in both a secure printing mode and a non-secure printing mode. On the other hand, FIG. 3 describes the ROM 3004 as a secondary spool buffer as a buffer having a low priority for use only in the secure printing. In this embodiment, the ROM 3004 is used as the secondary spool buffer only at the time of secure printing. Meanwhile, deletion of the spool data from the ROM 3004 is always executed in the case where a predetermined period of time has passed since the storage of the spool data after completion of the printing or in the case where the printer 1 is turned off. Note than an example of the spool data in this embodiment is the print data. In the meantime, the main controller 3001 counts the number of sheets printed with the printer 1 and stores information on the cumulative number of printed sheets as a job history in the ROM 3004.

<Regarding Management of Memory Areas>

Figure 4:
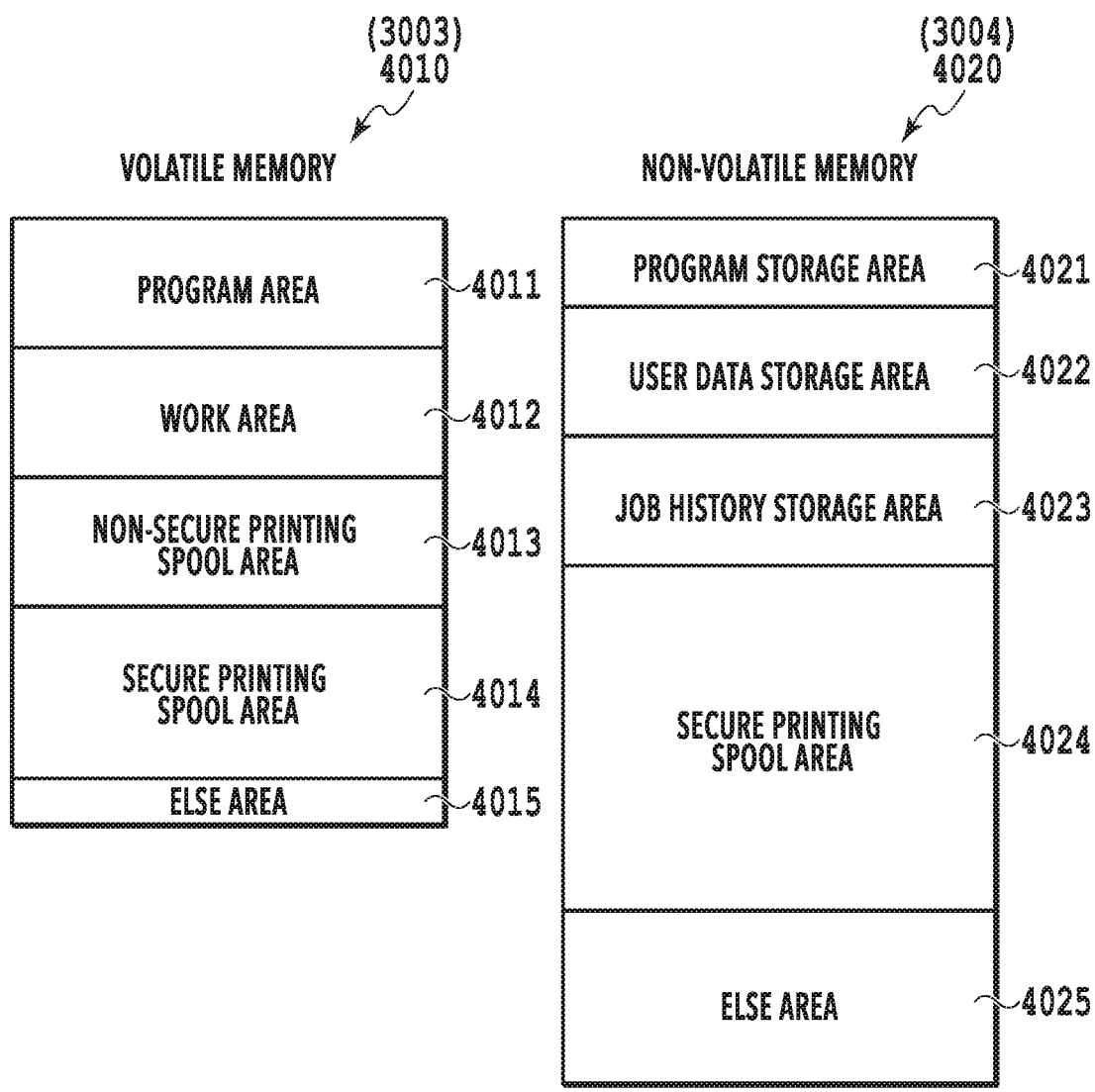
FIG. 4 is an explanatory diagram showing memory areas.

Management of the memory area in the ROM 3004 and the memory area in the RAM 3003 mentioned above will be explained below with reference to FIG. 4. FIG. 4 is a diagram showing an outline of management of internal areas of a volatile memory and a non-volatile memory, respectively. In FIG. 4, the RAM 3003 shown in FIG. 3 is described as a volatile memory 4010 and the ROM 3004 therein is described as a non-volatile memory 4020.

The volatile memory 4010 includes a program area 4011, a work area 4012, a non-secure printing spool area 4013, a secure printing spool area 4014, and an else area 4015. The program area 4011 is an area that stores an execution program copied from the non-volatile memory 4020. The booted CPU fetches the program from this area and executes the program. However, the execution program may be fetched directly from the non-volatile memory in some cases. Accordingly, the program area in the volatile memory is not essential. The work area 4012 stores work-in-progress intermediate data and the like.

The non-secure printing spool area 4013 stores spool data used only in the non-secure printing. The secure printing spool area 4014 stores spool data used only in the secure printing. Note that each of these areas can also be regarded as part of the work area in the broad sense. However, since the method of managing the memory areas is being discussed herein, the non-secure printing spool area 4013 and the secure printing spool area 4014 are defined separately from the work area 4012 for the sake of convenience. The else area 4015 is formed from blocks used for management inside the volatile memory 4010, namely, blocks to be substituted for defective blocks and the like.

The non-volatile memory 4020 includes a program storage area 4021, a user data storage area 4022, a job history storage area 4023, a secure printing spool area 4024, and an else are 4025. The entity of the execution program is stored in the program storage area 4021. As mentioned above, the CPU executes processing in accordance with the program stored in the program storage area 4021 either by copying the program into the volatile memory 4010 or by directly fetching the program from the non-volatile memory 4020. In this embodiment, the execution program stored in the program storage area 4021 includes information used for a maintenance operation of the print head (hereinafter referred to as maintenance information). The maintenance information is data concerning a schedule for executing the maintenance operation at a prescribed timing, for example.

The user data storage area 4022 stores user data. To be more precise, the user data is information concerning a telephone directory as well as an address book of a user, and various settings on the printer 1 such as luminance of a liquid crystal display (LCD) unit and a sound volume of a user interface. Note that information concerning partitioning of the spool buffer and switching of the spool buffer to be used, and the like is also stored in the user data storage area 4022. Here, the information concerning the partitioning of the spool buffer is information indicating respective sizes of the spool area in the volatile memory 4010 and of the spool area in the non-volatile memory 4020. Meanwhile, the information concerning the switching of the spool buffer is information indicating the size of the spool data, for example. Depending on the size of the spool data to be stored, it is determined whether the data is to be stored in the secure printing spool area 4014 or the secure printing spool area 4024.

The job history storage area 4023 stores information on the number of print jobs received in a predetermined period such as a day or a week, on the sizes of the print data, and so forth. The secure printing spool area 4024 only stores the spool data used in the secure printing. Specifically, the secure printing spool area 4024 is used in a case of generation of the spool data which is larger in size than a free space in the secure printing spool area 4014 in the volatile memory 4010. The else area 4025 is formed from blocks used for management inside the non-volatile memory 4020, namely, blocks to be substituted for defective blocks and the like.

<Regarding Functions of eMMC>

Figure 5:
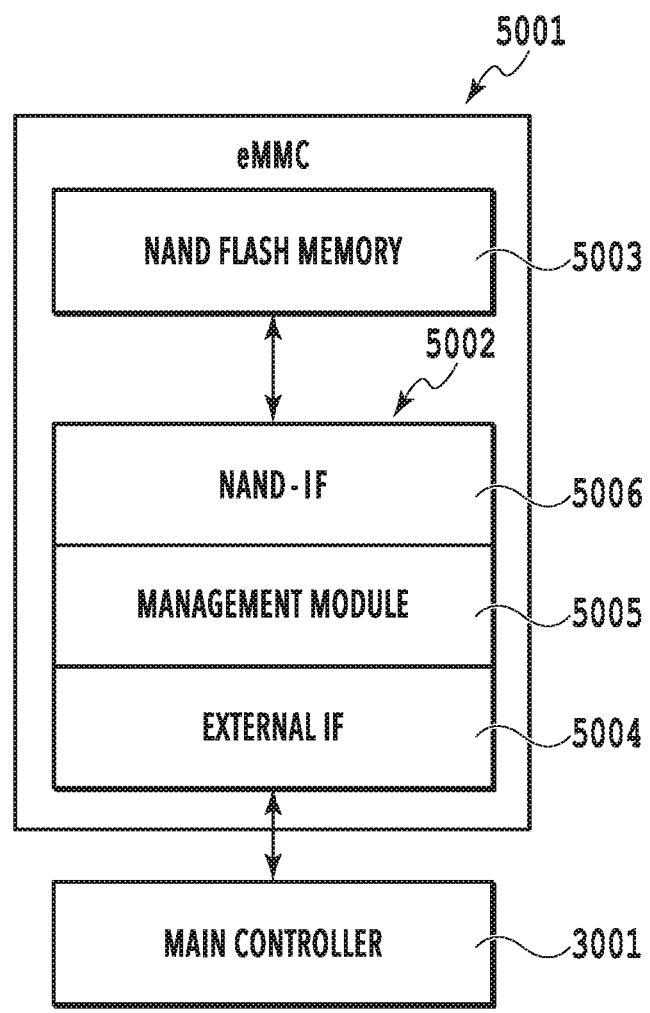
FIG. 5 is a block diagram showing a mode of connection between an eMMC and a main controller.

Functions of the eMMC assumed to be used as the non-volatile memory 4020 will be described below with reference to FIG. 5. FIG. 5 is a block diagram showing an internal configuration of an eMMC 5001 and a mode of connection between the eMMC 5001 and the main controller 3001.

In FIG. 5, the non-volatile memory 4020 shown in FIG. 4 is described as the eMMC 5001. As discussed earlier, the eMMC 5001 includes a NAND flash memory controller 5002 and a NAND flash memory 5003 formed in one chip. The NAND flash memory controller 5002 includes an external IF 5004, a management module 5005 serving as management unit, and a NAND-IF 5006. Based on a command, the external IF 5004 communicates with the main controller 3001 serving as a host device. The management module 5005 performs wear leveling, defective block management, and the like. The NAND-IF 5006 communicates with the NAND flash memory 5003 in the eMMC 5001.

The management module 5005 includes various registers. These registers include an operating conditions register (OCR) that holds operating conditions of the eMMC 5001 itself, and a register holding data indicating characteristics of the eMMC 5001 (device specific data). Note that the device specific data has also been called card specific data in terms of MMC card compatibility. Accordingly, this specification will abbreviate the card specific data as CSD and call a register holding the CSD as a CSD register.

Among such CSD registers, an extended CSD register defined by The JEDEC Solid State Technology Association and frequently undergoing functional additions at standard updates is prepared to indicate compatible functions and settings thereof together with internal state information. Especially, a "pre_EOL_information" item (hereinafter referred to as PRE_EOL_INFO) indicating a state of substitute blocks corresponding to defective blocks as shown in FIG. 6 is added to the extended CSD register of Version 5.0 or later. Moreover, a "device life time estimation" item as shown in FIG. 7 is also added thereto as a value indicating a state of consumption of a life time of the eMMC 5001. In short, the non-volatile memory 4020 of this embodiment holds state information (FIG. 6) that indicates a state of defective blocks in the non-volatile memory 4020, and information (FIG. 7) indicating a residual amount of the life time of the non-volatile memory 4020 which is different from the information in FIG. 6.

However, the management of the memory areas of the eMMC 5001 may still be insufficient even in the case of using the above-described register. For example, the state detectable with the PRE_EOL_INFO is categorized only into three stages. Specifically, the PRE_EOL_INFO indicates only three stages of: a state of consumption below 80% of all the substitute blocks (a state where normal use is available); a state of consumption of 80% of the substitute blocks (a state of warning); and a state of depletion of the substitute blocks (a state of emergency). As a consequence, even if an alarm is issued due to the consumption of 80% of the prepared substitute blocks for replacing the defective blocks, it is highly likely that numerous defective blocks have already been generated at this stage and it is too late for sufficient countermeasures. This is due to the following reason.

Due to the characteristic feature of the NAND flash memory, a block that has exceeded an available number of times of normal rewriting operations (hereinafter referred to as the life time number of times of rewriting operations) is prone to turn into a defective block. Meanwhile, as a consequence of equalization of the numbers of times of rewriting operations by the wear leveling, normal blocks are also prone to turn into defective blocks in a state where numerous defective blocks have been generated. In other words, in the case where the alarm is issued by the PRE_EOL_INFO due to the consumption of 80% of the substitute blocks, it is highly likely that the remaining normal blocks will also turn into defective blocks soon. Accordingly, even if the use of the secure printing spool buffer is suspended at the point of consumption of the 80% of the substitute blocks, the normal blocks will turn into defective blocks soon due to rewriting of the normal blocks for other use. In this case, the eMMC 5001 may come to the end of its life time before the number of printed sheets reaches the number of sheets estimated to be printable. Thus, the life time of the printer will be determined by the life time of the eMMC 5001.

A primary function of the secure printing spool buffer is to reduce wait time for completion of input of subsequent print data caused by detention of print data inputted earlier. However, extension of the above-mentioned wait time would rather be more preferable than discontinuation of product usage due to the eMMC 5001 coming to the end of its life time as a result of the use as the secure printing spool buffer. Accordingly, it is preferable to suspend the use as the spool buffer either at a stage where the functions as the product are still maintained, that is, before the occurrence of defective blocks, or at a stage where the numbers of times of rewriting operations of the respective blocks executed are significantly less than the life time number of times of rewriting operations.

Given the situation, in this embodiment, the main controller 3001 refers to a value indicated in the above-mentioned device life time estimation item before writing data into the eMMC 5001. The value indicated in the device life time estimation item is a value obtained by dividing a sum of average numbers of times of rewriting operations by the respective blocks corresponding to the number of the blocks by a total value of the life time numbers of times of rewriting operations of all the blocks, which is an estimated value showing s state of consumption of the life time of the eMMC 5001 being the ROM. In the present specification, this value will be hereinafter referred to as a second life time rate (a second life time consumption rate).

In the device life time estimation item shown in FIG. 7, values 0x00 to 0x0A are used as values corresponding to the second life time rate and the state of the eMMC 5001 is expressed on a 10-point scale. By use of the second life time rate of the eMMC 5001 expressed in the device life time estimation item, the main controller 3001 can detect an internal state (a state of life time consumption) of the eMMC 5001. Here, the second life time rate discussed herein is defined as the estimated value due to the following reason.

Specifically, although the numbers of times of rewriting operations are equalized among the respective blocks as a result of leveling processing, slight variations may occur due to the internal state. Accordingly, the number of times of rewriting operations is preferably calculated as the average value among all the blocks.

After the second life time rate is obtained by referring to the device life time estimation item, the second life time rate is compared with a first life time rate (a first life time consumption rate) estimated based on the number of sheets having been printed (the cumulative number of printed sheets). Then, if the first life time rate is equal to or above the second life time rate, an allocation capacity in the eMMC 5001 to be allocated to the secondary spool buffer will be restricted on the supposition that the life time of the eMMC 5001 is close to the end. In this way, it is possible to extend the life time of the eMMC 5001 until the printer 1 completes printing of the number of sheets estimated to be printable during the life time. In this embodiment, two or more first life time rates different in magnitude are defined as the first life time rates (first life time consumption rates) to be compared with the second life time rate. To be more precise, a first threshold (one of the first life time consumption rates) and a second threshold (the other first life time consumption rate) are defined as the first life time rates. These thresholds are compared with the second life time rate and the capacity in the eMMC to be allocated to the spool buffer is restricted based on a result of the comparison. Specific methods of setting the first threshold and the second threshold will be described later.

Meanwhile, there are two types of the device life time estimation item of Type A and Type B to be precise. JEDEC defines values to be indicated in the items of the respective types but does not define how to use Type A and Type B differently. For this reason, the usage of these items varies among device vendors. Nonetheless, Type A and Type B are used differently in conformity to storage modes of the NAND flash memory included in the eMMC 5001 in general. Such a storage mode represents a storage density to be stored in each memory cell.

In order to deal with an increase in capacity of a memory in recent years, data to be stored in each cell tends to be increased in bits. Usually, the data to be stored in each cell is stored in accordance with the single-level cell mode (hereinafter referred to as the SLC mode) configured to be determined by using binary values (1 bit) indicating whether or not a charge is present in the target cell. On the other hand, in the case of a device being a multi-bit product which is configured to store data in accordance with the multi-level cell mode (hereinafter referred to as the MLC mode), for example, a voltage state in one cell may take on a state out of four stages (that is, 2 bits). For this reason, the MLC mode can store data which is twice as large as that of the SLC mode and therefore has an advantage of ease of achieving a large capacity. However, the MLC mode also has disadvantages such as requirement of longer write time as compared to the SLC mode at the same capacity, deterioration in the useful number of times of rewriting operations on the block basis. This embodiment assumes to use the eMMC that embeds the NAND flash memory adopting the MLC mode.

As described above, both of the above-described two storage modes have advantages and disadvantages. Accordingly, a determination as to which storage mode is to be adopted should be made by considering the advantages and disadvantages of the respective modes from the viewpoint of preference of product features. Meanwhile, a mode called the pseudo-SLC mode is also known as a mode that is compatible with various products. The pseudo-SLC mode is a mode configured to store data in a cell adopting the MLC mode while using the two-stage voltage state like the SLC mode. In this embodiment, one of Type A and Type B of the device life time estimation is assumed to indicate the life time rate in the case of storage in accordance with a default storage mode (the MLC mode in this case) applicable to the NAND flash memory in the eMMC. Meanwhile, the other type is assumed to indicate the life time rate in the case of storage in accordance with the pseudo-SLC mode.

In the meantime, there are also other modes such as a mode called the triple-level cell mode (hereinafter referred to as the TLC mode) that enables storage with 3 bits per cell by using the 8-stage voltage state in the multi-bit product. In the case of adopting this mode, one of Type A and Type B of the device life time estimation is assumed to indicate the life time rate in the case of storage in accordance with the default storage mode (the TLC mode in this case). Meanwhile, the other type is assumed to indicate the life time rate in the case of storage in accordance with the pseudo-SLC mode. An object of this embodiment is to control the capacity of the non-volatile memory, which has the upper limit of the number of times of rewriting operations, used as the spool buffer even in the case where one of Type A and Type B is configured to indicate the default storage mode.

<Regarding Processing to Write Spool Data into Non-Volatile Memory>

Now, an example of the problem to be solved by this embodiment will be described in detail. Any of a DRAM which is the volatile memory and a HDD or the like which is the non-volatile memory is frequently used as the spool buffer. The spool buffer is the area for temporarily storing the print data until a user outputs a printed material by inputting a print instruction. Accordingly, the spool buffer does not have to retain the print data after the print output unless the circumstances are exceptional. In the secure printing in particular, it is desirable to delete the print data from the spool buffer immediately after completion of the print output in light of security. Therefore, the DRAM being the volatile memory is suitable for the spool buffer.

However, a cost per memory capacity unit of the DRAM is relatively high and it is preferable to keep its capacity in use to the minimum necessary. If part of the limited capacity is used as the spool buffer, the capacity for storing the print data may run short in case multiple users transmit the print data. Accordingly, the HDD having a relatively low cost per memory capacity unit is frequently used as the spool buffer. Nonetheless, the HDD is prone to a mechanical failure due to deterioration caused by aging of a rotational mechanism therein. The HDD also has a problem that this device requires relatively large electric power for operation. The use of a non-volatile semiconductor memory such as the NAND flash memory is a conceivable operation for solving the aforementioned problems. In recent years, the NAND flash memories have been reduced in size and increased in capacity. This is why the NAND flash memories are replacing the HDDs for use in storage of program data, user data, and so forth, thus expanding the applications.

However, the NAND flash memory has a limitation in the number of times of rewriting operations and has a problem that a block therein that has exceeded an allowable number of times of rewriting operations as a consequence of repeated rewriting becomes unusable. Note that the rewriting operations mentioned herein represent both deleting and writing. The unusable blocks are treated as defective blocks, and the NAND flash memory is designed to deal with this problem by assigning unused blocks therein as the substitute blocks. Nonetheless, if the defective blocks are increased so much that the substitute blocks to be assigned are not enough, the NAND flash will no longer be usable as the memory of the previously estimated capacity. This is why the equalizing processing called the wear leveling takes place. In this equalization processing, the NAND flash memory controller manages and controls the rewriting into the respective blocks in the NAND flash memory, and allocates the substitute blocks appropriately so as to equalize the rewriting operations among the blocks. In this way, the life time of the NAND flash memory can be extended.

In general, the NAND flash memory controller is connected to the NAND flash memory and is either formed inside an ASIC that embeds a CPU or formed as a separate device that can directly communicate with the CPU. Under this configuration, the NAND flash memory controller controls the NAND flash memory based on a command from the CPU. Here, writing and reading operations in and out of the NAND flash memory are conducted by the page that represents a set of memory cells while a deleting operation is conducted by the block that represents a set of the pages. Moreover, due to its internal structure, the NAND flash memory does not allow direct rewriting of saved data. Instead, it is necessary to read the data to be rewritten from the target page out to the DRAM or the like, to rewrite a section in the data subject to rewriting, and then to write the processed data again into a different page after deleting the existing data therefrom. Here, in the case of deleting the original target page that has stored the data before the rewriting, the data not targeted for the deletion in the same block also needs to be read out and written into a different block. As a consequence, a frequency of deletion is increased in the case where the NAND flash memory is used as part of the spool buffer as mentioned above because the spool data is changed every time the printing takes place. In other words, depending on how the NAND flash memory is used, it is likely that the number of times of rewiring operations of the NAND flash memory reaches the life time number of times of rewriting operations before the cumulative number of printed sheets by the printer reaches the life time number of printed sheets, whereby the NAND flash memory may fail to obtain the capacity according to the specifications. For this reason, in the case of using the NAND flash memory for storing the control program for the printer as well as log data and the like, there has been a risk of inoperability of the printer. This embodiment can solve this problem by executing the processing shown in FIG. 8.

<Spool Data Write Processing in this Embodiment>

Write processing of spool data used for the secure printing (hereinafter also referred to as secure print data) in this embodiment will be described below with reference to a flowchart shown in FIG. 8. The main controller 3001 receives the secure print data (S801), and determines whether or not the RAM 3003 can store the entire secure print data received (S802). In other words, the main controller 3001 determines whether or not a free space in the secure printing spool area 4014 allocated to the RAM 3003 is equal to or larger than a data quantity of the secure print data. Here, in the case where the RAM 3003 cannot store the entire secure print data, the main controller 3001 determines that the data needs to be written into the ROM 3004 and the processing proceeds to S803. On the other hand, the data does not have to be written into the ROM 3004 in the case where the RAM 3003 can store the entire secure print data. Accordingly, the RAM 3003 stores the entire secure print data received (S811). In this embodiment, the capacity in the eMMC 5001 being the ROM 3004 to be allocated to the secure printing spool buffer is set to 512 MB at a maximum.

In S803, the main controller 3001 reads the values of the two items of Type A and Type B of the device life time estimation item, which are held in the extended CSD register. Each of the values of the two items of Type A and Type B is the value obtained by dividing the sum of the average numbers of times of rewriting operations by the respective blocks in the eMMC 5001 being the ROM 3004 corresponding to the number of the blocks by the total value of the life time numbers of times of rewriting operations of all the blocks (the life time rate).

Moreover, the main controller 3001 obtains the information on the cumulative number of printed sheets in the job history from the management module 5005 of the NAND flash memory controller 5002 in the ROM 3004 (S804). Thereafter, in S805, the main controller 3001 calculates the first threshold and the second threshold, which represent the life time rates of the ROM 3004, in addition to the information according to the device life time estimation.

The first threshold and the second threshold are estimated values of the number of times of rewriting operations of the ROM which are obtained based on the current cumulative number of printed sheets. The first threshold is obtained by the following formula 1:

the first threshold=((100%−system tolerance percentage)/the number of sheets estimated to be printable during the life time of the printer)×the information on the cumulative number of printed sheets+the system tolerance percentage      (formula 1).

The second threshold is obtained by the following formula 2:

the second threshold=(100%/the number of sheets estimated to be printable during the life time of the printer)×the information on the cumulative number of printed sheets+the system tolerance percentage      (formula 2).

In the formula 1 and the formula 2, the system tolerance percentage means the life time rate of the ROM 3004 which can properly activate the control system of the printer. In this embodiment, the system tolerance percentage is set to 50% and the number of sheets estimated to be printable during the life time of the printer is set to 500,000 sheets.

Here, in the case where the cumulative number of printed sheets is equal to 250,000 sheets, for example, the formula 1 calculates:

the first threshold=(100−50)/500,000×250,000+ 50=75%.

Meanwhile, the formula 2 calculates:

the second threshold=100/500,000×250,000=50%.

In this example, the system tolerance percentage is set to 50%. However, the system tolerance percentage is not limited to 50%. The system tolerance percentage may be set to any value that transitions within a range where the life time rate of the ROM 3004 can maintain the functions as the system. Alternatively, the system tolerance percentage may be changed depending on the number of sheets. Meanwhile, FIG. 9 shows the example of setting the number of sheets estimated to be printable during the life time of the printer to 500,000 sheets. However, the number of sheets estimated to be printable during the life time of the printer is the value to be determined based on the specifications of the printer and is not limited to the number used as the example.

In S806, the main controller 3001 determines whether or not the value indicated in the device life time estimation item read out in S802, namely, the current life time rate of the ROM 3004 (the second life time rate) is equal to or above the first threshold. In this case, the main controller 3001 of this embodiment determines whether or not both of the second life time rate indicated in the item of Type A and the second life time rate indicated in the item of Type B that are read out in S803 exceed the first threshold. Here, the processing proceeds to S807 if the result of determination is YES, that is, in the case where both of the second life time rates indicated in the item of Type A and in the item of Type B exceed the first threshold. If the result of determination in S806 is NO, the number of times of rewriting operations of the ROM 3004 at the present moment can be deemed to be sufficiently lower than the life time number of times of rewriting operations. In the meantime, the processing proceeds to S808 in the case where the result of determination in S806 is YES.

This embodiment is configured to determine whether or not both of the second life time rates indicated in the item of Type A and in the item of Type B of the device life time estimation exceed the first threshold. However, it is also possible to adopt a different determination method. For example, the value indicated in the item of Type A may be compared with the value indicated in the item of Type B and a determination may be made as to whether or not the larger one of the two values exceeds the first threshold.

In S807, the main controller 3001 determines whether or not the second life time rate read out in S803 exceeds the second threshold. Specifically, the main controller 3001 determines whether or not both of the values (the second life time rates) in the item of Type A and in the item of Type B that are read out in S803 exceed the second threshold. Here, if the result of determination in S807 is NO, the second life time rate representing the life time rate of the ROM 3004 is deemed to exceed the remaining life time defined in the second threshold, and the processing proceeds to S810. On the other hand, the processing proceeds to S809 in the case where the result of determination in S807 is YES. In S807, the main controller 3001 determines whether or not both of the values (the second life time rates) indicated in the two items of Type A and Type B of the device life time estimation exceed the second threshold. However, it is also possible to adopt a different determination method. For example, the value of Type A may be compared with the value of Type B and a determination may be made as to whether or not the larger one of the two values exceeds the second threshold.

In the case where the processing proceeds to S808 in accordance with the result of determination in S806 that turns out to be YES as mentioned above, the main controller 3001 restricts the capacity in the ROM 3004 to be used as the secure printing spool buffer. Specifically, the capacity in the ROM 3004 to be allocated to the secure printing spool buffer is set to 0 MB. Here, the print data that has already been stored in the secure printing spool area 4024 in the ROM 3004 is retained until the data is deleted by a deleting operation to be executed either after completion of the printing based on the relevant print data or after a passage of a predetermined period from the completion of the printing. The empty block after deleting the print data therefrom is used as an area for the wear leveling processing.

Meanwhile, in S809 described above, the main controller 3001 relaxes the restriction on the capacity in the ROM 3004 to be allocated to the secure printing spool buffer as compared to S808. Specifically, the capacity in the ROM 3004 to be allocated to the secure printing spool buffer is set to 256 MB. Then, the main controller 3001 executes writing of the spool data (the secure print data) received in S801 into the ROM 3004.

In the meantime, in S810 described above, the main controller 3001 does not restrict the capacity in the ROM 3004 to be allocated to the secure printing spool buffer, and the capacity allocated to the secure printing spool buffer is set to a maximum capacity of 512 MB. Then, the main controller 3001 executes writing of the spool data (the secure print data) received in S801 into the ROM 3004.

The details of the processing to write the spool data into the ROM 3004 executed in this embodiment have been described above.

FIG. 9 is a graph illustrating the capacity allocated to the spool buffer, which is allocated into the ROM 3004 by the processing shown in the flowchart of FIG. 8. In FIG. 9, the horizontal axis indicates the number of sheets printed with the printer 1 and the vertical axis indicates the second life time rate (the second life time consumption rate) obtained from the item of the device life time estimation, respectively. Two lines L1 and L2 plotted in FIG. 9 are lines indicating the first threshold and the second threshold, respectively, which are calculated in S804 described above. FIG. 9 shows an example in which the first threshold and the second threshold to be changed in accordance with the number of printed sheets are linearly changed in accordance with the number of printed sheets. However, the thresholds are not limited only to those that are changed linearly as shown in FIG. 9. The threshold may plot different lines that indicate values obtained by calculations different from the formulae 1 and 2 as long as such lines indicate transition of the life time rate that can maintain the functions of the system along with changes in the number of printed sheets. Such lines may also be curved lines that represent curvilinear changes.

Figure 10:
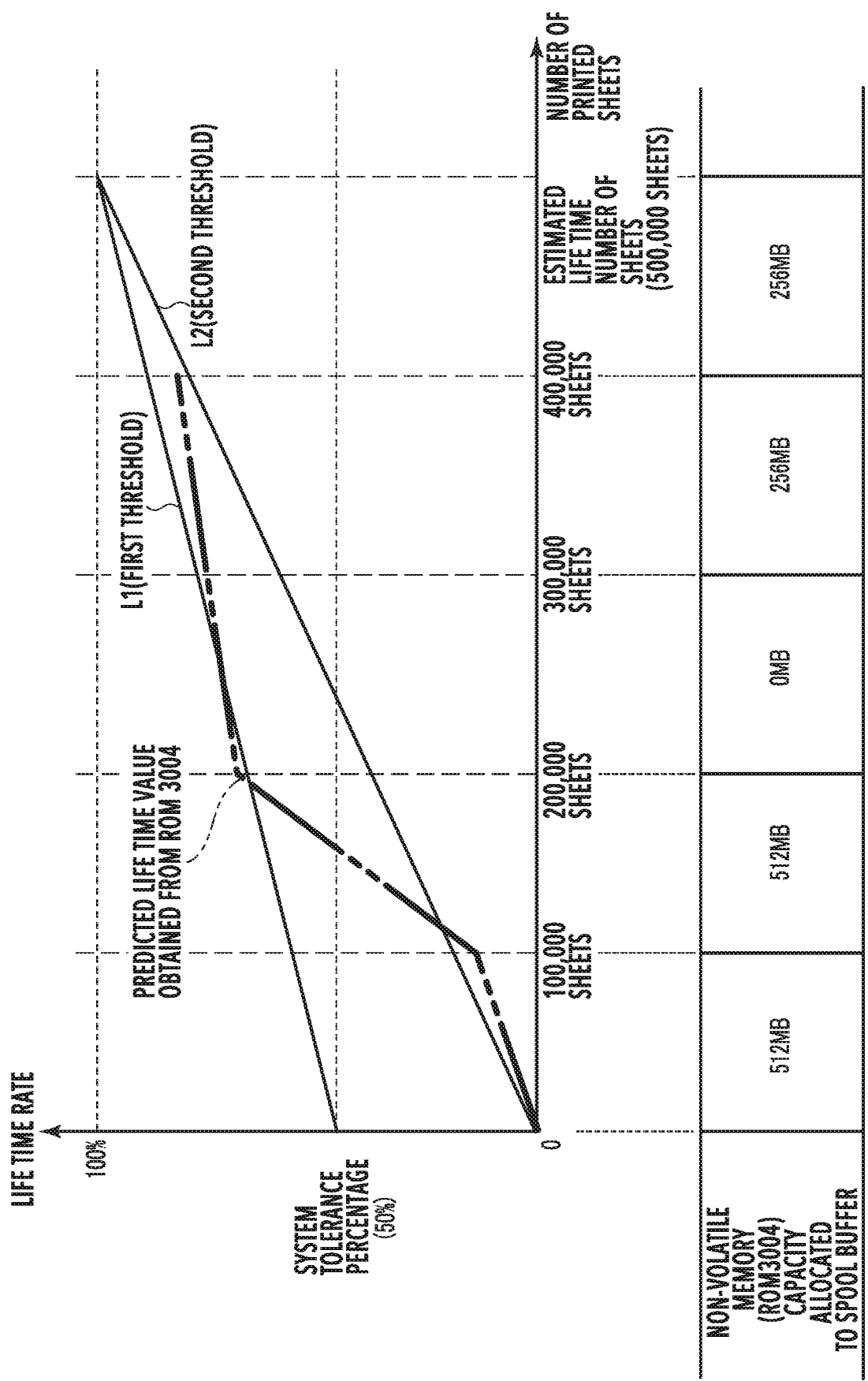
FIG. 10 is a diagram showing an example of a capacity allocated to a spool buffer.

As described above, the processing illustrated in the flowchart of FIG. 8 is characterized in that the capacity in the ROM 3004 to be allocated to the spool buffer is changed based on the result of comparison between the first threshold and the second threshold each representing the second life time rate with the first life time rate. FIG. 10 shows an example in which the capacity allocated to the spool buffer is changed once in every 100,000 printed sheets. At a point where the number of printed sheet is 0, the life time rate of the eMMC 5001 being the ROM 3004 is equal to 0%. Accordingly, a maximum capacity of 512 MB is allocated to the spool buffer. Meanwhile, at a stage where the number of printed sheets is gradually increased to 100,000 sheets, the second life time rate read out of the device life time estimation item falls below the second threshold which is one of the life time rates estimated based on the number of printed sheets. Accordingly, the capacity allocated to the spool buffer during a period from the 100,000 printed sheets to 200,000 printed sheets is kept at the maximum capacity of 512 MB.

In the subsequent printing period from 100,000 to 200,000 sheets, the life time rate of the ROM 3004 read out of the device life time estimation item exceeds the first threshold. In other words, due to the printing operations from the 100,000 sheets to 200,000 sheets, the life time rate of the ROM 3004 exceeds the life time rate (the first threshold) predicted in accordance with the number of printed sheets. This means the situation in which the number of times of rewriting operations is extraordinarily increased. Accordingly, if the ROM 3004 is continuously used in this way, the life time of the ROM 3004 may come to the end (the life time rate at 100%) before the number of sheets printed with the printer 1 reaches the number of sheets estimated to be printable during the life time of the printer. Therefore, the capacity in the ROM 3004 to be allocated to the spool buffer is set to 0 MB during the subsequent printing period from 200,000 sheets to 300,000 sheets. In other words, the use of the spool buffer in the ROM 3004 is prohibited for printing 200,000 to 300,000 sheets. In this way, it is possible to obviate a lapse of the printer into an inoperable state due to the ROM 3004 coming to the end of its life time. In the case of prohibiting the use of the spool buffer, a notice that the spool buffer is out of order may be issued to users.

In the example shown in FIG. 10, as a consequence of prohibiting the use of the spool buffer for the printing of 200,000 to 300,000 sheets, the second life time rate read out of the device life time estimation item during the printing of 200,000 to 300,000 sheets falls in a range below the first threshold and above the second threshold. Given the situation, the capacity of 256 MB in the ROM 3004 is allocated to the spool buffer in the subsequent printing of 300,000 sheets to 400,000 sheets. In other words, the spool buffer can store the secure print data up to 256 MB.

In the example shown in FIG. 10, the life time rate of the ROM 3004 falls below the first threshold and exceeds the second threshold during the printing of 300,000 to 400,000 sheets. For this reason, the capacity to be allocated to the spool buffer is maintained at 256 MB during the subsequent printing of 400,000 sheets to 500,000 sheets. While this embodiment has described the example of changing the capacity in the non-volatile memory to be allocated to the spool buffer once in every 100,000 sheets, the interval (the number of printed sheets) to change the allocated capacity is not limited to the number suggested in the example. Incidentally, the life time rate of the ROM 3004 becomes higher along with the increase in the cumulative number of printed sheets. Accordingly, the interval in the number of sheets to change the capacity to be allocated to the spool buffer may be reduced along with the increase in the cumulative number of printed sheets. In this way, it is possible to more reliably suppress a sharp rise in the life time rate of the ROM 3004.

As described above, according to this embodiment, the second life time rate of the ROM 3004 read out of the device life time estimation item is compared with the first life time rate calculated based on the number of printed sheets. Then, the capacity in the non-volatile memory to be allocated to the spool buffer is restricted based on the result of the comparison. This makes it possible to increase the cumulative number of printed sheets until the ROM 3004 comes to the end of its life time. As a consequence, it is possible to avoid the occurrence of the situation where the printer lapses into an inoperable state due to the ROM 3004 coming to the end of its life time before the cumulative number of sheets printed with the printer 1 reaches the number of sheets estimated to be printable with the printer during its life time.

Here, due to the nature of the secure printing, the saved data needs to be definitely deleted. Nevertheless, the eMMC 5001 constituting the ROM 3004 turns into read-only in a case where the substitute blocks therein are depleted. In this case, the ROM 3004 may not be able to delete the data saved at the end if the ROM 3004 is used until the very last minute of the end of its life time. In this embodiment, the writing operation into the spool buffer is restricted before writing the spool data depending on the life time rate of the ROM 3004. Thus, it is also possible to avoid a situation where the data is undeletable.

According to this embodiment, it is possible to keep a printing apparatus from lapsing into an inoperable state due to a non-volatile memory coming to the end of its life time before the number of sheets printed with the printing apparatus reaches the number of sheets estimated to be printable with the printing apparatus during its life time.

Other Embodiments

The case of using the eMMC as the non-volatile memory (the ROM) has been described above. However, this disclosure is also applicable to a case where the eMMC is not used as the non-volatile memory. For instance, this disclosure is also applicable to a case where a NAND-IF and a NAND controller are built in a main controller and a NAND flash memory is directly connected thereto. In this case, the NAND controller fulfils the functions to execute management of defective blocks, the wear leveling processing, and derivation of the life time rate based on the number of times of rewriting operations involving the ROM.

Meanwhile, this disclosure has exemplified the inkjet printing apparatus configured to perform printing on a print medium by ejecting inks. It is to be noted, however, that this disclosure is also applicable to a printing apparatus other than the printing apparatus that performs a printing operation using inks. For example, this disclosure is also applicable to a so-called electrophotographic printing apparatus configured to form an image by attaching tonners onto a print medium.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-179210 filed Sep. 30, 2019, which is hereby incorporated by reference wherein in its entirety.

What is claimed is:

1. A printing apparatus comprising:
   a non-volatile memory having an upper limit in the number of times of data rewriting operations; and
   a management unit configured to manage use of the non-volatile memory as a spool buffer for print data, wherein
   the management unit includes
     a first derivation unit configured to derive a first life time consumption rate based on a cumulative number of printed sheets of print media printed with a printing unit, the first life time consumption rate indicating a state of consumption of a life time of the non-volatile memory, and
     a second derivation unit configured to derive a second life time consumption rate based on the number of times of rewriting operations of the non-volatile memory, the second life time consumption rate indicating the state of consumption of the life time of the non-volatile memory, and
   the management unit controls a capacity allocated to a spool buffer being defined in the non-volatile memory based on a result of comparison between the second life time consumption rate and the first life time consumption rate.

2. The printing apparatus according to claim 1, wherein the management unit performs the control of the capacity allocated to the spool buffer once in every predetermined number of printed sheets.

3. The printing apparatus according to claim 1, wherein the management unit restricts the capacity allocated to the spool buffer being defined in the non-volatile memory to a capacity smaller than a predetermined maximum capacity in a case where the second life time consumption rate is larger than the first life time consumption rate.

4. The printing apparatus according to claim 3, wherein the first derivation unit derives a plurality of the first life time consumption rates being mutually different, and the management unit compares a magnitude relation with each of the plurality of the first life time consumption rates and defines the capacity allocated to the spool buffer in accordance with a result of the comparison.

5. The printing apparatus according to claim 4, wherein the first derivation unit derives two first life time consumption rates being different from each other as the first life time consumption rates,
   the management unit sets the capacity allocated to the spool buffer to the maximum capacity in a case where the second life time consumption rate is smaller than one of the first life time consumption rates,
   the management unit sets the capacity allocated to the spool buffer to 0 in a case where the second life time consumption rate exceeds the other first life time consumption rate being larger than the one first life time consumption rate, and
   the management unit sets the capacity allocated to the spool buffer to a capacity larger than 0 and smaller than the maximum capacity in a case where the second life time consumption rate is larger than the one first life time consumption rate and smaller than the other first life time consumption rate.

6. The printing apparatus according to claim 5, wherein the second derivation unit derives the second life time consumption rate by dividing a sum of average numbers of times of rewriting operations by a plurality of blocks defined in the non-volatile memory and corresponding to the number of the blocks by a total value of life time numbers of times of rewriting operations of all the blocks in the non-volatile memory.

7. The printing apparatus according to claim 1, wherein
the non-volatile memory is adapted to store data in accordance with any of a first storage mode and a second storage mode, and
the second derivation unit derives the second life time consumption rate in accordance with the storage mode adopted by the non-volatile memory.

8. The printing apparatus according to claim 1, wherein the non-volatile memory and the second derivation unit are incorporated in a single-chip embedded multimedia card.

9. The printing apparatus according to claim 1, wherein the second life time consumption rate is a value indicated in a device life time estimation item provided in an embedded multimedia card.

10. The printing apparatus according to claim 1, further comprising:
a volatile memory including an area as a spool buffer to store print data, wherein
print data for secure printing and print data for non-secure printing are stored in the spool buffer in the volatile memory, and
the print data for secure printing is stored in the spool buffer in the non-volatile memory.

11. A controlling method for a printing apparatus including
a non-volatile memory having an upper limit in the number of times of data rewriting operations, and
a management unit configured to manage use of the non-volatile memory as a spool buffer for print data,
the controlling method comprising:
deriving a first life time consumption rate based on a number of printed sheets printed with a printing unit, the first life time consumption rate indicating a state of consumption of a life time of the non-volatile memory; and
deriving a second life time consumption rate based on the number of times of rewriting operations of the non-volatile memory, the second life time consumption rate indicating the state of consumption of the life time of the non-volatile memory; and
controlling a capacity allocated to a spool buffer being defined in the non-volatile memory based on a result of comparison between the second life time consumption rate and the first life time consumption rate.

12. The controlling method according to claim 11, wherein the controlling a capacity allocated to a spool buffer is carried out once in every predetermined number of printed sheets.

13. The controlling method according to claim 11, wherein the capacity allocated to the spool buffer being defined in the non-volatile memory is restricted to a capacity smaller than a predetermined maximum capacity in a case where the second life time consumption rate is larger than the first life time consumption rate.

14. The controlling method according to claim 13, wherein
a plurality of the first life time consumption rates being mutually different are derived, and
a magnitude relation with each of the plurality of the first life time consumption rates is compared and the capacity allocated to the spool buffer is defined in accordance with a result of the comparison.

15. The controlling method according to claim 14, wherein
two first life time consumption rates being different from each other are derived as the first life time consumption rates,
the capacity allocated to the spool buffer is set to the maximum capacity in a case where the second life time consumption rate is smaller than one of the first life time consumption rates,
the capacity allocated to the spool buffer is set to 0 in a case where the second life time consumption rate exceeds the other first life time consumption rate being larger than the one first life time consumption rate, and
the capacity allocated to the spool buffer is set to a capacity larger than 0 and smaller than the maximum capacity in a case where the second life time consumption rate is larger than the one first life time consumption rate and smaller than the other first life time consumption rate.

16. The controlling method according to claim 15, wherein the second life time consumption rate is derived by dividing a sum of average numbers of times of rewriting operations by a plurality of blocks defined in the non-volatile memory and corresponding to the number of the blocks by a total value of life time numbers of times of rewriting operations of all the blocks in the non-volatile memory.

17. The controlling method according to claim 11, wherein
the non-volatile memory is adapted to store data in accordance with any of a first storage mode and a second storage mode, and
the second life time consumption rate is derived in accordance with the storage mode adopted by the non-volatile memory.

18. The controlling method according to claim 11, wherein the second life time consumption rate is a value indicated in a device life time estimation item provided in an embedded multimedia card.

19. The controlling method according to claim 11, wherein
a volatile memory including an area as a spool buffer to store print data is further provided,
print data for secure printing and print data for non-secure printing are stored in the spool buffer in the volatile memory, and
the print data for secure printing is stored in the spool buffer in the non-volatile memory.

20. A non-transitory computer readable storage medium storing a program for causing a computer to perform a controlling method for a printing apparatus including
a non-volatile memory having an upper limit in a number of times of data rewriting operations, and
a management unit configured to manage use of the non-volatile memory as a spool buffer for print data,
the controlling method comprising:
deriving a first life time consumption rate based on a number of printed sheets printed with a printing unit, the first life time consumption rate indicating a state of consumption of a life time of the non-volatile memory; and
deriving a second life time consumption rate based on a number of times of rewriting operations of the non-volatile memory, the second life time consumption rate indicating the state of consumption of the life time of the non-volatile memory; and
controlling a capacity allocated to a spool buffer being defined in the non-volatile memory based on a result of comparison between the second life time consumption rate and the first life time consumption rate.

* * * * *